United States Patent [19]

Maass et al.

[11] 4,001,168
[45] Jan. 4, 1977

[54] TRANSPARENT STORAGE-STABLE POLYSILOXANES WHICH CROSS-LINK UNDER ATMOSPHERIC CONDITIONS

[75] Inventors: Günther Maass, Cologne; Hans Joachim Lücking, Bergisch-Neukirchen; Hans Sattlegger, Odenthal-Gloebusch; Karl-Heinz Rudolph, Cologne, all of Germany

[73] Assignee: Bayer Aktiengesellschaft, Leverkusen, Germany

[22] Filed: Mar. 18, 1975

[21] Appl. No.: 559,473

[30] Foreign Application Priority Data

Mar. 22, 1974 Germany .......................... 2413850

[52] U.S. Cl. ...................... 260/37 SB; 260/46.5 G
[51] Int. Cl.² .......................................... C08L 83/04
[58] Field of Search .................................. 260/37 SB

[56] References Cited

UNITED STATES PATENTS

| 3,065,194 | 11/1962 | Nitzsche et al. | 260/37 SB |
| 3,133,891 | 5/1964 | Ceyzeriat | 260/37 SB X |
| 3,359,237 | 12/1967 | Boissieras et al. | 260/37 SB X |
| 3,457,214 | 7/1969 | Modic | 260/37 SB |
| 3,624,023 | 11/1971 | Hartlage | 260/37 SB |
| 3,689,454 | 9/1972 | Smith et al. | 260/37 SB X |

Primary Examiner—Lewis T. Jacobs
Attorney, Agent, or Firm—Burgess, Dinklage & Sprung

[57] ABSTRACT

A polysiloxane composition which can be cross-linked under atmospheric conditions and which consists essentially of:

a. 100 parts by weight of an $\alpha,\omega$-dihydroxymethylphenylpolysiloxane with about 7–15 mole % of diphenylsiloxy units or about 14–28 mole % of methylphenylsiloxy units, and having a viscosity of between about 1,000 and 500,000 cSt (at 20° C), b. about 1 to 40 parts by weight of an uncoated reinforcing filler consisting essentially of $SiO_2$ having a specific surface area of about 40 to 500 m²/g by the BET method, and c. about 1 to 10 parts by weight of a cross-linking agent of the formula $$RSiX_3$$

wherein
R is an alkyl, halogenoalkyl, aryl, or arylalkyl radical, and
X is an alkoxy, acyloxy, oximato or alkylamino radical.

A curing catalyst may also be present. The composition is clear as are the silicone rubbers produced upon curing.

6 Claims, No Drawings

TRANSPARENT STORAGE-STABLE POLYSILOXANES WHICH CROSS-LINK UNDER ATMOSPHERIC CONDITIONS

The present invention relates to plastically modable mixtures of organopolysiloxanes with an uncoated SiO₂ filler, which crosslink on access of water or water vapor to give a transparent polysiloxane elastomer.

So-called air-curing silicone rubber compositions have been known for some time past and are principally used as jointing mastics in the building trade, in sanitary installations and in the construction of aquaria. The various mixtures, based on one component or on two components, are colored with fillers and pigments to suit the particular end use. For glass bonding of all kinds, and for casting compositions, for example for electronic components, transparent silicone rubbers are however frequently required, but hitherto it has not been possible to produce these in a satisfactory quality.

The known compositions in general contain, in addition to an α,ω-dihydroxydimethylpolysiloxane and a trifunctional silicon compound subject to hydrolytic attack, a filler which has a decisive influence on the strength of the rubber. This filler is, as a rule, a highly disperse silicon dioxide which, however, produces the known turbidities in a methylpolysiloxane, unless it is mixed with a reactive resin which is complicated to prepare, such as, say, that described in U.S. Pat. Specification No. 3,457,214. Since, however, such resins are very unstable, easily gel and normally cause brown colorations, mixtures of this type can hardly be used in practice. Attempts have therefore been made to discover resin-free transparent compositions.

German Published Specification No. 2,117,027 for the first time described such a system without resin. It contains, as the filler, pyrogenically produced SiO₂ which has to be subjected to a very costly special treatment before being mixed in. In this process, the filler is treated with bistrimethylsilylamine so that it contains about 3.5 to 7% of carbon. Such coating is relatively costly and it is therefore desirable to circumvent such a treatment as far as possible.

It is accordingly an object of the invention to provide an inexpensive composition and process for producing clear silicone rubbers.

This and other objects and advantages are realized in accordance with the present invention pursuant to which there is provided a polysiloxane mixture which can be crosslinked under atmospheric conditions and which consists essentially of:

a. 100 parts by weight of an α,ω-dihydroxymethylphenylpolysiloxane with about 7–15 mole % of diphenylsiloxy units or about 14–28 mole % of methylphenylsiloxy units, and having a viscosity of between about 1,000 and 500,000, cSt (at 20° C), b. about 1 to 40 parts by weight of an uncoated reinforcing filler, consisting essentially of SiO₂ having a specific surface area of about 40 to 500 m²/g by the BET method, and c. about 1 to 10 parts by weight of a crosslinking agent of the general formula

wherein
R is an alkyl, halogenalkyl, aryl or arylalkyl radical and

X is an alkoxy, acyloxy, oximato or alkylamino radical, and d. optionally, a curing catalyst which is in itself known.

Surprisingly, it has been found that it is not necessary to coat the filler in order to obtain clear compositions, provided very specific α,ω-dihydroxymethylphenylpolysiloxanes and one of the crosslinking agents which are in themselves known are used.

These αω-dihydroxymethylphenylpolysiloxanes employed according to the invention contain dimethylsiloxy and diphenylsiloxy or methylphenylsiloxy groups. Other organic radicals bonded to silicon should not be present in amounts of more than about 1 mole %. Given a statistical distribution of diphenylsiloxy and dimethylsiloxy units, these oils contain about 7–15 mole % of diphenylsiloxy groups. If a polysiloxane with dimethyl and phenylmethyl units is employed, about 14–28 mole % of phenylmethylsiloxy groups must be contained therein. However, it is also possible to employ copolymers which contain dimethylsiloxy, diphenylsiloxy and methylphenylsiloxy groups, as well as mixtures of the polysiloxanes described, provided the proportion of the diphenylsiloxy and methylphenylsiloxy units gives the requisite molar amount of the total mixture. The α,ω-dihydroxypolysiloxanes described can also be mixed with methyl-blocked methylphenylpolysiloxanes to improve the quality of the cured rubber. The two oils to be mixed must then however be very silimar in phenyl content since they will otherwise form turbid emulsions. The viscosity range of the oils used encompasses about 1,000 to 500,000 centistoke (at 20° C).

Uncoated commercially available silicon dioxide products can be employed as reinforcing fillers. The specific surface area by the BET method can vary between about 40 and 500 m²/g.

The following can be employed as crosslinking agents:

Silicon compounds of the general formula

wherein
R is an alkyl or alkenyl group having up to 6 carbon atoms such as, for example, methyl, ethyl, n- or iso-propyl, vinyl and allyl, cycloalkyl such as cyclohexyl, a halogenoalkyl group, such as, for example, chloromethyl, chloroethyl or bromomethyl, an aryl group, such as, for example, phenyl, or an alkylaryl or arylalkyl group, such as, for example, phenyl in conjunction with lower alkyl, e.g. tolyl, benzyl and xylyl, and X is an alkoxy group having up to 6 carbon atoms, such as, for example, methoxy, ethoxy, propoxy and butoxy, an acyloxy group, such as, for example, lower acyloxy, e.g. acetoxy or propionoxy, an oximato group, such as, for example, an oxime of a lower alkyl ketone or aldehyde wherein the alkyl groups have up to 4 carbon atoms, e.g. butanonoximato, or an alkylamino group wherein the alkyl group has up to 6 carbon atoms, such as, for example, cyclohexylamino, ethylamino or methylamino.

Preferred crosslinking agents are: alkyltriacyloxysilanes (methyltriacetoxysilane, vinyltriacetoxysilane or phenltriacetoxysilane), methyltriethoxysilane, methyltrimethoxysilane, methyl-tris(cyclohexylamino)-silane, methyltris-(butanonoximato)-silane and their partial hydrolysis products.

Since the reactivity of the crosslinking agents in many cases does not suffice to ensure sufficiently rapid formation of the rubber, curing catalysts are incorporated into the past where appropriate. Compounds which accelerate the reaction are, in addition to amines, particularly metal salts of organic monocarboxylic acids, such as, for example, dibutyl-tin dilaurate and dibutyl-tin diacetate. The metal in these salts can be: lead, tin, zirconium, antimony, iron, cadmium, titanium, calcium, barium, bismuth or manganese. The requisite amount of catalyst depends on the special formulation for a particular purpose but should not exceed about 10% by weight of the total mixture; it is in general between about 0.2 and 5%, preferably between about 0.5 and 2% (by weight).

Additives such as dialkoxydiacetoxysilanes, which improve the adhesion, can be admixed without problem. Depending on the choice of the crosslinking agent, the compositions can be formulated as one-component or two-component systems, and the use of solvents is also not excluded by the invention.

The compositions according to the invention are waterclear, plastic pastes which cure at room temperature and normal humidity to give a glass-clear silicone rubber. With certain crosslinking agents (for example alkyltriacyloxysilanes), the mixtures can be stored if air is excluded. Because of the excellent transparency of the resulting rubbers, the compositions are particularly suitable for glass bonding of all kinds, say in constructing display windows and aquaria, and for use as heat-stable potting compositons.

The present invention will now be explained in yet further detail with the aid of the examples which follow:

EXAMPLE 1

83 g of $\alpha,\omega$-dihydroxymethylphenylpolysiloxane (13.1 mole % of diphenylsiloxy units, viscosity 90,000 centistokes) were mixed with 9.5 g of highly disperse silica (Aerosil 130); surface area = 130 m$^2$/g) in a kneader. 6 g of vinyltriacetoxysilane, 1.5 g of dibutoxydiacetoxysilane and 5 mg of dibutyl-tin diacetate were successively incorporated into this paste. After kneading for a further 30 minutes in vacuo, the clear composition was filled into a storage vessel. A 2 mm thick test coating on a glass plate formed a skin after a few minutes and had cured after one day to a glass-clear silicone rubber. After storage in a vessel which was closed air-tight (10 days at 50° C) the composition exhibited the original crosslinking behavior in air.

EXAMPLE 2

80 g of $\alpha,\omega$-dihydroxymethylphenylpolysiloxane (14.1 mole % of diphenylsiloxy units, viscosity 105,000 centistokes) and 10 g of highly disperse silica (Aerosil 130; surface area 130 m$^2$/g) gave a plastic composition after 15 minutes' kneading, and 6 g of methyltriacetoxysilane were then incorporated into this composition. After further addition of 1.5 g of dibutoxydiacetoxysilane and 5 mg of dibutyl-tin dilaurate, the sample mixture was thoroughly kneaded for 30 minutes and then degassed and packed. It cured in air to a glass-clear rubber with good mechanical properties, and a test layer crosslinked normally even after 10 days' storage at 50° C.

EXAMPLE 3

150 g of $\alpha,\omega$-dihydroxymethylphenylpolysiloxane (13.4 mole % of diphenylsiloxy units, viscosity 65,000 centistokes) were stirred with 18 g of highly disperse silica (Aerosil 130). 12 g of methyltris-(butanonoximato)silane, 3.0 g of dibutoxy-diacetoxysilane and 10 mg of dibutyl-tin dilaurate were kneaded successively into this composition. After degassing the paste, a clear composition was obtained, which cured to a rubber of excellent transparency. The composition was stable on storage if air was excluded.

EXAMPLE 4

249 g of an $\alpha,\omega$-dihydroxymethylphenylpolysiloxane (13.4 mole % of diphenylsiloxy units, viscosity 191,000 centistokes) were mixed with 28.5 g of highly disperse silica (Aerosil 130) and 18 g of N,N-bis(triethoxysilylmethyl)allylamine were then added. After 10 minutes' kneading, 4.5 g of dibutoxy-diacetoxysilane were also worked in and the composition was degassed in the kneader and then packed. The slightly yellow-colored paste cured under atmospheric conditions to give an outstandingly clear rubber and was stable on storage.

EXAMPLE 5

31.5 g of pyrogenically produced silica (Aerosil 130) were kneaded into 250 g of an $\alpha,\omega$-dihydroxymethylphenylpolysiloxane (13.1 mole % of diphenylsiloxy units, viscosity 27,300 centistokes). 9 g of methyltriethoxysilane and 3 g of dibutyl-tin dilaurate were then mixed in for 10 minutes in the kneader. After degassing, the composition was applied as a 2 mm thick layer which cured within 24 hours to a rubber of excellent transparency.

EXAMPLE 6

4.5 g of methyltrimethoxysilane and 1.5 g of dibutyl-tin dilaurate were added to a mixture of 125 g of an $\alpha,\omega$-dihydroxymethylphenylpolysiloxane (13.1 mole % of diphenylsiloxy units, viscosity 27,300 centistokes) and 15.7 g of highly disperse silicon dioxide (Aerosil 130) and the whole was kneaded for 15 minutes. After degassing, a clear plastic composition was obtained, which, as a 2 mm thick layer, cures in air to give a rubber of excellent clarity.

EXAMPLE 7

A highly viscous mass was produced in a kneader from 249 g of an $\alpha,\omega$-dihydroxymethylphenylpolysiloxane (10 mole % of diphenylsiloxy groups, viscosity 180,000 centistokes) and 28.5 g of a reinforcing SiO$_2$ filler (Aerosil 130). After adding 18 g of methyltriacetoxysilane, the mixture was kneaded for 10 minutes and 4.5 g of dibutoxydiacetoxysilane and 15 mg of dibutyl-tin laurate were then incorporated successively. After degassing, a clear composition was obtained, which exhibited very good storage stability and cured to a rubber of excellent transparency.

EXAMPLE 8

A composition of 250 g of an $\alpha,\omega$-dihydroxymethylphenylpolysiloxane (9.1 mole % of diphenylsiloxy units, viscosity 66,000 centistokes), 28.5 g of highly disperse silica (Aerosil 130), 18 g of methyltriacetoxysilane, 4.5 g of dibutoxydiacetoxysilane and 15 mg of dibutyl-tin dilaurate showed excellent storage stability if moisture was excluded, but cures in air to a water-clear rubber.

EXAMPLE 9

249 g of an α,ω-dihydroxymethylphenylpolysiloxane (14 mole % of diphenylsiloxy units, viscosity 73,000 centistokes) were mixed with 28.5 g of highly disperse SiO₂ filler (Aerosil 130) in a kneader. Thereafter, 18 g of vinyltriacetoxysilane and 15 mg of dibutyl-tin dilaurate were kneaded in successively. After degassing, a composition was obtained which cured in air to give a rubber of excellent clarity. The storage stability proved to be very good.

EXAMPLE 10

18 g of vinyltriacetoxysilane, 4.5 g of dibutoxyacetoxysilane and 15 mg of dibutyl-tin dilaurate were successively mixed into a composition of 250 g of an α,ω-dihydroxymethylphenylpolysiloxane (13 mole % of diphenysiloxy units, viscosity 27,300 centistokes) and 28,5 g of a highly disperse SiO₂ filler of surface area 380 m²/g (Aerosil 380) in a kneader. After degassing, a 2 mm thick test layer was applied, and this crosslinked under atmospheric conditions to a water-clear rubber. The mixture was stable on storage if air was excluded.

EXAMPLE 11

125 g of an α, ω-dihydroxymethylphenylpolysiloxane (13 mole % of diphenylsiloxy units, viscosity 27,300 centistokes) were mixed in a kneader with 14.5 g of a highly disperse SiO₂ filler (surface area: 200 m²/g; Aerosil 200). Thereafter, 9 g of methyltriacetoxysilane and 10 mg of dibutyltin dilaurate were worked in successively. The resulting storage-stable one-component paste cured to a completely transparent rubber.

EXAMPLE 12

18 g of methyltriacetoxysilane, 4.5 g of dibutoxydiacetoxysilane and 15 mg of dibutyl-tin dilaurate were added successively to a mixture of 249 g of α,ω-dihydroxymethylphenylpolysiloxane (11.9 mole % of diphenylsiloxy units, viscosity 33,700 centistokes) and 44.5 g of pyrogenically produced silica (Aerosil 130). The composition proved to be storage-stable after degassing and the rubber formed in air was glass-clear.

EXAMPLE 13

189 g of an α,ω-dihydroxymethylphenylpolysiloxane (15 mole % of diphenylsiloxy units, viscosity 73,000 centistokes) were mixed in a kneader with 60 g of an α,ω-dimethylphenylmethylpolysiloxane (14 mole % of diphenylsiloxy units, viscosity 408 centistokes) and 28.5 g of pyrogenically produced silicon dioxide (Aerosil 130) were then worked in. After further admixture of 18.0 g of vinyltriacetoxysilane, 4.5 g of dibutoxy-diacetoxysilane and 15 mg of dibutyl-tin dilaurate, the mixture was degassed and applied as a 2 mm thick layer. It formed a water-clear rubber with good mechanical properties and was, furthermore, storage-stable.

EXAMPLE 14

249 g of an α, ω-dihydroxymethylphenylpolysiloxane (18.8 mole % of methylphenylsiloxy groups, 81.2 mole % of dimethylsiloxy units, viscosity 74,600 centistokes) and 28.5 of a highly disperse SiO₂ filler (Aerosil 130) were mixed in a kneader to form a homogeneous composition. After additionally working in 18 g of methyl-triacetoxysilane and 15 mg of dibutyl-tin dilaurate, and degassing, a paste was produced which cured under atmospheric conditions to give a rubber of excellent clarity. The mixture was stable on storage if air was excluded.

COMPARISON EXAMPLE 1

249 g of an α,ω-dihydroxymethylphenylpolysiloxane (20.7 mole % of diphenylsiloxy units, viscosity 18,600 centistokes) were mixed with 28.5 g of highly disperse silica (Aerosil 130) in a kneader. Thereafter, 18 g of methyltriacetoxysilane, 4.5 g of dibutoxydiacetoxysilane and 15 mg of dibutyl-tin dilaurate were worked in successively. After degassing, a plastic composition was obtained, which cured in air to a rubber with good mechanical properties, but which was very turbid.

COMPARISON EXAMPLE 2

18 g of vinyltriacetoxysilane, 4.5 g of dibutoxydiacetoxysilane and 15 mg of dibutyl-tin dilaurate were added successively, in a kneader, to 249 g of an α,ω-dihydroxymethylphenylpolysiloxane (5.9 mole % of diphenylsiloxy units, 226,000 centistokes) and 28.5 g of pyrogenically produced silica. The paste obtained after degassing cured in air to a very turbid rubber.

It will be appreciated that the instant specification and examples are set forth by way of illustration and not limitation, and that various modifications and changes may be made without departing from the spirit and scope of the present invention.

What is claimed is:
1. A polysiloxane composition which can be cross-linked under atmospheric conditions to a transparent silicone elastomer and which consists essentially of:
  a. 100 parts by weight of an α,ω-dihydroxymethylphenylpolysiloxane with about 7–15 mole % of diphenylsiloxy units or about 14–28 mole % of methylphenylsiloxy units, and having a viscosity of between about 1,000 and 500,000 cSt (at 20° C),
  b. about 1 to 40 parts by weight of an uncoated reinforcing filler consisting essentially of SiO₂ having a specific surface area of about 40 to 500 m²/g by the BET method, and
  c. about 1 to 100 parts by weight of a cross-linking agent of the formula

wherein
  R is an alkyl, alkenyl, halogenoalkyl, phenyl or phenylalkyl radical having up to 6 carbon atoms in each alkyl or alkenyl moiety, or cyclohexyl, and
  X is an alkoxy or alkylamino radical having up to 6 carbon atoms in each alkyl moiety, a lower acyloxy radical or an oxime radical of an alkyl ketone or aldehyde having up to 4 carbon atoms.

2. A composition according to claim 1 containing about 0.2 to 10% by weight of a curing catalyst.

3. A composition according to claim 1 wherein said crosslinking agent is at least one member selected from the group consisting of methyltriacetoxysilane, vinyltriacetoxysilane, phenyltriacetoxysilane, methyltriethoxysilane, methyltrimethoxysilane, methyl-tris(cyclohexylamino)-silane, methyl-tris-(butanonoximato)-silane, and a partial hydrolysis product thereof.

4. A composition according to claim 1 wherein R is a methyl, ethyl, n-propyl, iso-propyl, vinyl, allyl, cyclohexyl, chloromethyl, chloroethyl, bromomethyl, phenyl, tolyl, benzyl or xylyl radical, and X is a methoxy, ethoxy, propoxy, butoxy, acetoxy, propionoxy, butanonoximato, cyclohexylamino, ethylamino or methylamino radical.

5. A composition according to claim 4 containing about 0.5 to 2% by weight of a curing catalyst, said crosslinking agent being at least one member selected from the group consisting of methyltriacetoxysilane, vinyltriacetoxysilane, phenyltriacetoxysilane, methyltriethoxysilane, methyltrimethoxysilane, methyl-tris(cyclohexylamino)silane, methyl-tris-(butanonoximato)-silane, and a partial hydrolysis product thereof.

6. A clear silicone rubber produced by curing a composition according to claim 1.

* * * * *